United States Patent
Lo Priore et al.

(10) Patent No.: US 7,029,781 B2
(45) Date of Patent: Apr. 18, 2006

(54) MICROFUEL CELL HAVING ANODIC AND CATHODIC MICROFLUIDIC CHANNELS AND RELATED METHODS

(75) Inventors: Stefano Lo Priore, Dallas, TX (US); Michele Palmieri, Agrate Brianza (IT); Ubaldo Mastromatteo, Bareggio (IT)

(73) Assignee: STMicroelectronics, Inc., Carrollton, TX (US)

( * ) Notice: Subject to any disclaimer, the term of this patent is extended or adjusted under 35 U.S.C. 154(b) by 475 days.

(21) Appl. No.: 10/348,519

(22) Filed: Jan. 21, 2003

(65) Prior Publication Data

US 2004/0142214 A1   Jul. 22, 2004

(51) Int. Cl.
- H01M 8/10 (2006.01)
- H01M 8/04 (2006.01)
- H01M 8/24 (2006.01)

(52) U.S. Cl. .............. 429/32; 429/38; 429/39
(58) Field of Classification Search ............... None
See application file for complete search history.

(56) References Cited

U.S. PATENT DOCUMENTS

| | | | |
|---|---|---|---|
| 5,230,849 A | 7/1993 | Hsu | 264/104 |
| 5,753,385 A | 5/1998 | Jankowski et al. | 429/44 |
| 6,312,846 B1 * | 11/2001 | Marsh | 429/30 |
| 6,348,280 B1 | 2/2002 | Maeda et al. | 429/38 |
| 6,415,860 B1 | 7/2002 | Kelly et al. | 165/748 |
| 6,426,160 B1 | 7/2002 | Hagino et al. | 429/34 |
| 6,447,945 B1 | 9/2002 | Streckert et al. | 429/34 |
| 6,638,654 B1 * | 10/2003 | Jankowksi et al. | 429/26 |
| 6,911,275 B1 * | 6/2005 | Michels et al. | 429/26 |
| 2001/0036523 A1 | 11/2001 | Sobolewski | 428/36.9 |
| 2002/0006539 A1 | 1/2002 | Kubota et al. | 429/44 |
| 2002/0020053 A1 | 2/2002 | Fonash et al. | 29/623.1 |
| 2002/0028372 A1 | 3/2002 | Ohlsen et al. | 429/40 |
| 2002/0071978 A1 | 6/2002 | Bekkedahl et al. | 429/25 |
| 2002/0076599 A1 | 6/2002 | Neutzler et al. | 429/38 |
| 2002/0122972 A1 | 9/2002 | Klitsner et al. | 429/42 |

FOREIGN PATENT DOCUMENTS

EP   0 846 347   6/1998

(Continued)

OTHER PUBLICATIONS

Nafion; Perfluorosulfonatelonomer Membranes; John Payne; pp. 1-4, http://www.psrc.usm.edu/mauritz/nafion.htm; May 26, 2001.

*Primary Examiner*—Michael Barr
*Assistant Examiner*—Karie O'Neill
(74) *Attorney, Agent, or Firm*—Lisa K. Jorgenson; Christopher F. Regan

(57) ABSTRACT

A microfuel cell includes a substrate and a plurality of spaced-apart PEM dividers extending outwardly to define anodic and cathodic microfluidic channels. An anodic catalyst/electrode lines at least a portion of the anodic microfluidic channels, and a cathodic catalyst/electrode lines at least a portion of the cathodic microfluidic channels. Each anodic and cathodic catalyst/electrode may extend beneath an adjacent portion of a PEM divider in some embodiments. Alternately, the microfuel cell may include a plurality of stacked substrates, in which a first substrate has first microfluidic fuel cell reactant channels. A PEM layer may be adjacent the first surface of the first substrate, an anodic catalyst/electrode layer may be adjacent one side of the PEM layer, and a cathodic catalyst/electrode layer may be adjacent an opposite side of the PEM layer. An adhesive layer may secure the first substrate to an adjacent substrate defining at least a second microfluidic fuel cell reactant channel.

56 Claims, 8 Drawing Sheets

FOREIGN PATENT DOCUMENTS

| | | |
|---|---|---|
| WO | 97/08766 | 3/1997 |
| WO | 01/37357 | 5/2001 |
| WO | 01/45190 | 6/2001 |
| WO | 01/80286 | 10/2001 |
| WO | 01/93976 | 12/2001 |
| WO | 02/31903 | 4/2002 |

* cited by examiner

MICROFUEL CELL HAVING ANODIC AND CATHODIC MICROFLUIDIC CHANNELS AND RELATED METHODS

FIELD OF THE INVENTION

The present invention relates to the field of portable power sources, and, more particularly, to portable fuel cells.

BACKGROUND OF THE INVENTION

A fuel cell typically comprises a pair of catalyst/electrodes and an ion-transporting electrolyte sandwiched between the catalyst/electrodes. Each catalyst/electrode, for example, may be a catalyst layer over which an electrode layer extends. Alternately, each may comprise an electrode layer impregnated with a catalyst.

One catalyst/electrode may serve as a reactive or catalytic site for oxidizing a fuel such as hydrogen ($H_2$), methanol ($CH_3OH$), or other hydrocarbon, while the other serves as a catalytic site for reducing a reactant, typically, air or pure oxygen ($O_2$). The electrolyte is typically a proton exchange media (PEM) that blocks the flow of electrons while conducting positively charged ions such as hydrogen ions.

The oxidation-reduction reactions at the respective catalytic sites thus result in a flow of electrons that are blocked by the PEM but are carried by a circuit connected to the fuel cell. Corresponding hydrogen protons migrate through the electrolyte. Accordingly, through the electrochemical reactions of the fuel or anodic reactant (e.g., $H_2$ or $CH_3OH$) with the cathodic reactant (e.g., air or $O_2$), the fuel cell becomes a source for electrical power.

The anodic and cathodic reactants may be carried in channels. Conventional fuel cells typically rely on channels that have been formed in a substrate for carrying the reactants. A frequently used substrate is silicon. U.S. Published Patent Application 2002/0122972 to Klitsner et al., for example, discloses a plurality of reactant channels formed in a pair of silicon substrates. One of the pair of substrates is adjacent a single anodic catalyst/electrode layer and the other is adjacent a single cathodic catalyst/electrode layer. A single layer comprising an electrolyte separates the two catalyst/electrode layers.

U.S. Published Patent Application 2002/0006539 to Kubota et al. similarly discloses a pair of catalyst/electrode layers that sandwich an electrolyte. An anodic reactant is carried in channels formed in a silicon substrate adjacent one of the catalyst/electrode layers, and a cathodic reactant is carried in channels formed in another silicon substrate adjacent the other catalyst/electrode layer.

Forming channels in a substrate, such as silicon, can add to the cost of manufacturing a fuel cell. Additionally, the formation of channels should desirably not result in removal of so much silicon that the structural integrity of the substrate is impaired. Conversely, though, if the number and/or size of the channels are limited for the sake of maintaining the structural integrity of the substrate, the surface area needed to facilitate the oxidation-reduction reactions will accordingly be limited. This trade-off between structural integrity and reaction surface requirements is a particularly important consideration in making fuel cells that are sufficiently small, that is, microfuel cells, to be successfully used for powering various types of electronic devices.

SUMMARY OF THE INVENTION

With the foregoing background in mind, it therefore is an object of the present invention to provide a microfuel cell that provides sufficient power while retaining its structural integrity and being relatively efficient to manufacture.

This and other objects, features, and advantages in accordance with the present invention are provided by a microfuel cell comprising in some embodiments a plurality of spaced-apart proton exchange media (PEM) dividers extending outwardly from a substrate to define a plurality of anodic and cathodic microfluidic channels that carry, respectively, anodic and cathodic reactants. The plurality of spaced-apart PEM dividers obviates the need to form channels in a substrate. One advantage is that the structural integrity of the substrate is not sacrificed for the sake of higher power density. Conversely, the catalyst surface-to-volume ratio of the microfuel cell may be increased to thereby further enhance the power density of the microfuel cell. The arrangement of the PEM dividers further permits the reactants to be carried in counterflow, which provides for better cooling of the microfuel cell.

An anodic catalyst/electrode may line at least a portion of each anodic microfluidic channel, and a cathodic catalyst/electrode may line at least a portion of each cathodic microfluidic channel. The plurality of anodic and cathodic microfluidic channels defined by the plurality of spaced-apart PEM dividers may comprise alternating anodic and cathodic microfluidic channels.

Each anodic catalyst/electrode may comprise an electrode layer impregnated with an anodic catalyst. Alternately, an anodic catalyst/electrode layer may comprise a discrete, thin anodic catalyst layer adjacent a porous electrode layer. Additionally, an anodic diffusion layer may overlie the anodic catalyst/electrode. Similarly, each cathodic catalyst/electrode may comprise an electrode layer impregnated with a cathodic catalyst, or, alternately, may comprise a thin, discrete cathodic catalyst layer adjacent a porous electrode layer. So, too, a cathodic diffusion layer may overlie the cathodic catalyst/electrode.

The microfuel cell may further comprise an anodic reactant manifold in fluid communication with the anodic microfluidic channels, as well as a cathodic reactant manifold in fluid communication with the microfluidic cathodic channels. The anodic and cathodic reactant manifolds may cause respective anodic and cathodic reactant flows in opposite directions.

Each microfluidic anodic reactant channel may have a height greater than a width thereof. Likewise, each microfluidic cathodic reactant channel also may have a height greater than a width thereof. Each of PEM dividers may comprise an organic polymer. The substrate may comprise silicon. The anodic reactant may comprise at least one of hydrogen ($H_2$), methane ($CH_4$), ethane ($C_2H_6$), propane ($C_3H_8$), butane ($C_4H_{10}$), and methanol ($CH_3OH$). The cathodic reactant may comprise at least one of air and oxygen ($O_2$).

In one embodiment, each anodic catalyst/electrode may further extend beneath an adjacent portion of a respective PEM divider. Each cathodic catalyst/electrode similarly may extend beneath an adjacent portion of a respective PEM divider.

In another embodiment the microfuel cell may include a plurality of substrates arranged in stacked relation, with a first substrate having first microfluidic fuel cell reactant channels therein and opening upwardly to a first surface thereof. Additionally, a PEM layer may be adjacent the first surface of the first substrate covering the microfluidic fuel cell reactant channels. An anodic catalyst/electrode may be adjacent one side of the PEM layer and a cathodic catalyst/electrode may be adjacent an opposite side of the PEM layer. An adhesive layer may secure the first substrate to an adjacent substrate in spaced relation therefrom to thus define at least one second microfluidic fuel cell reactant channel therebetween.

Another aspect of the invention relates to a method of making a microfuel cell. The method may include forming a plurality of spaced-apart PEM dividers to extend outwardly from a substrate, thereby defining a plurality of anodic and cathodic microfluidic channels for carrying respective anodic and cathodic reactants. The method may also include lining at least a portion of each anodic microfluidic channel with an anodic catalyst/electrode, and lining at least a portion of each cathodic microfluidic channel with a cathodic catalyst/electrode.

An additional method of making a microfuel cell may include forming a plurality of anodic and cathodic catalyst/electrodes on a substrate. The method further may include forming a plurality of spaced-apart PEM dividers to extend outwardly from the substrate, each PEM divider being formed to also extend over adjacent portions of a respective anodic catalyst/electrode and over an adjacent portion of a respective cathodic catalyst/electrode to thereby define a plurality of anodic and cathodic microfluidic channels for carrying respective anodic and cathodic reactants.

Yet another method of making a microfuel cell may include forming a PEM layer adjacent a first surface of a first substrate, the first substrate having microfluidic fuel cell reactant channels therein such that the PEM layer covers the channels. The method may further include forming an anodic catalyst/electrode adjacent one side of the PEM layer, and forming a cathodic catalyst/electrode adjacent an opposite side of the PEM layer. An adhesive layer may be used to secure the first substrate to an adjacent substrate in spaced relation therefrom, thus defining at least one second microfluidic fuel cell reactant channel between the spaced substrates.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
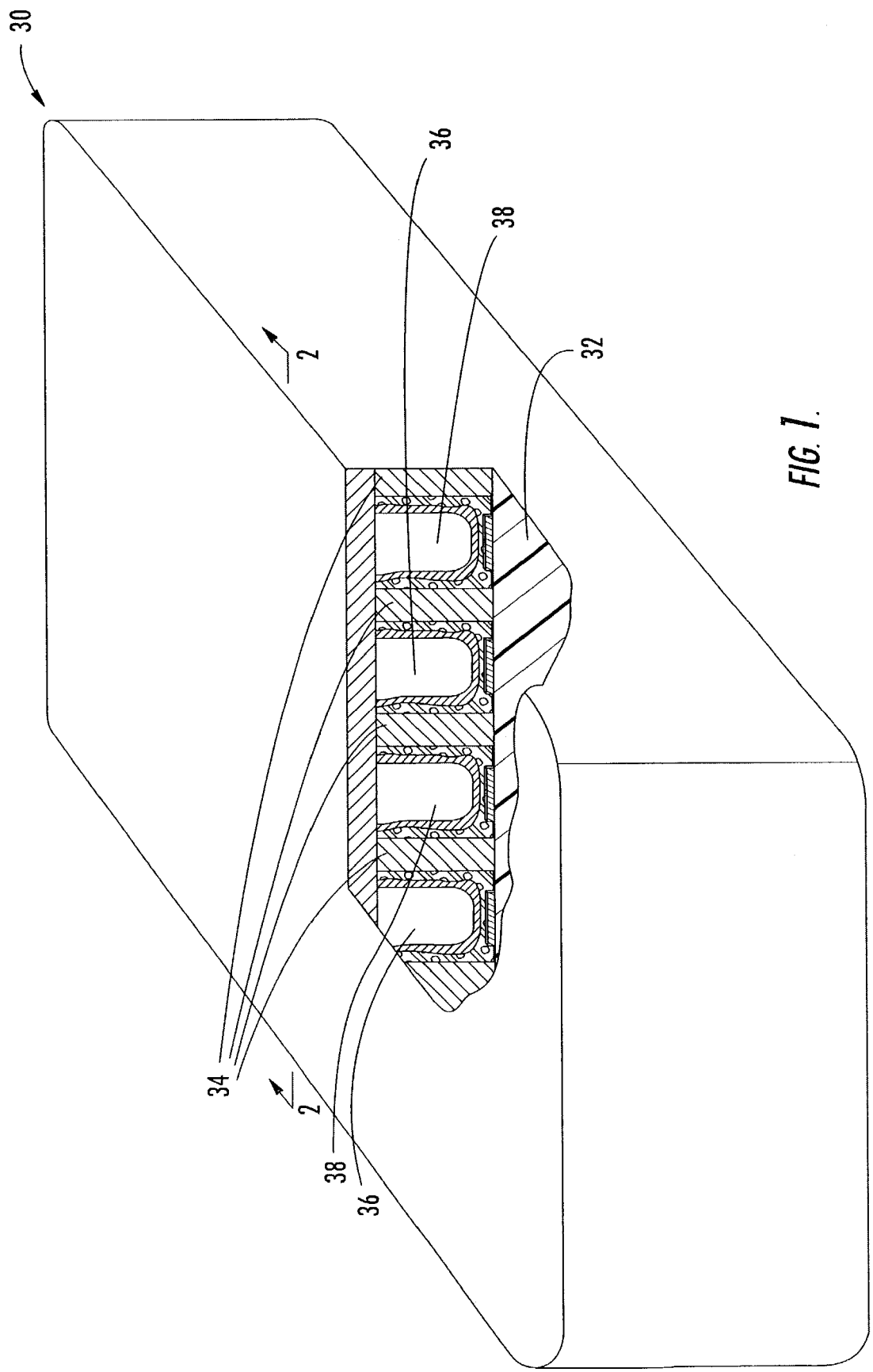
FIG. 1 is a fragmentary perspective view of a microfuel cell according to the invention.
Figure 2:
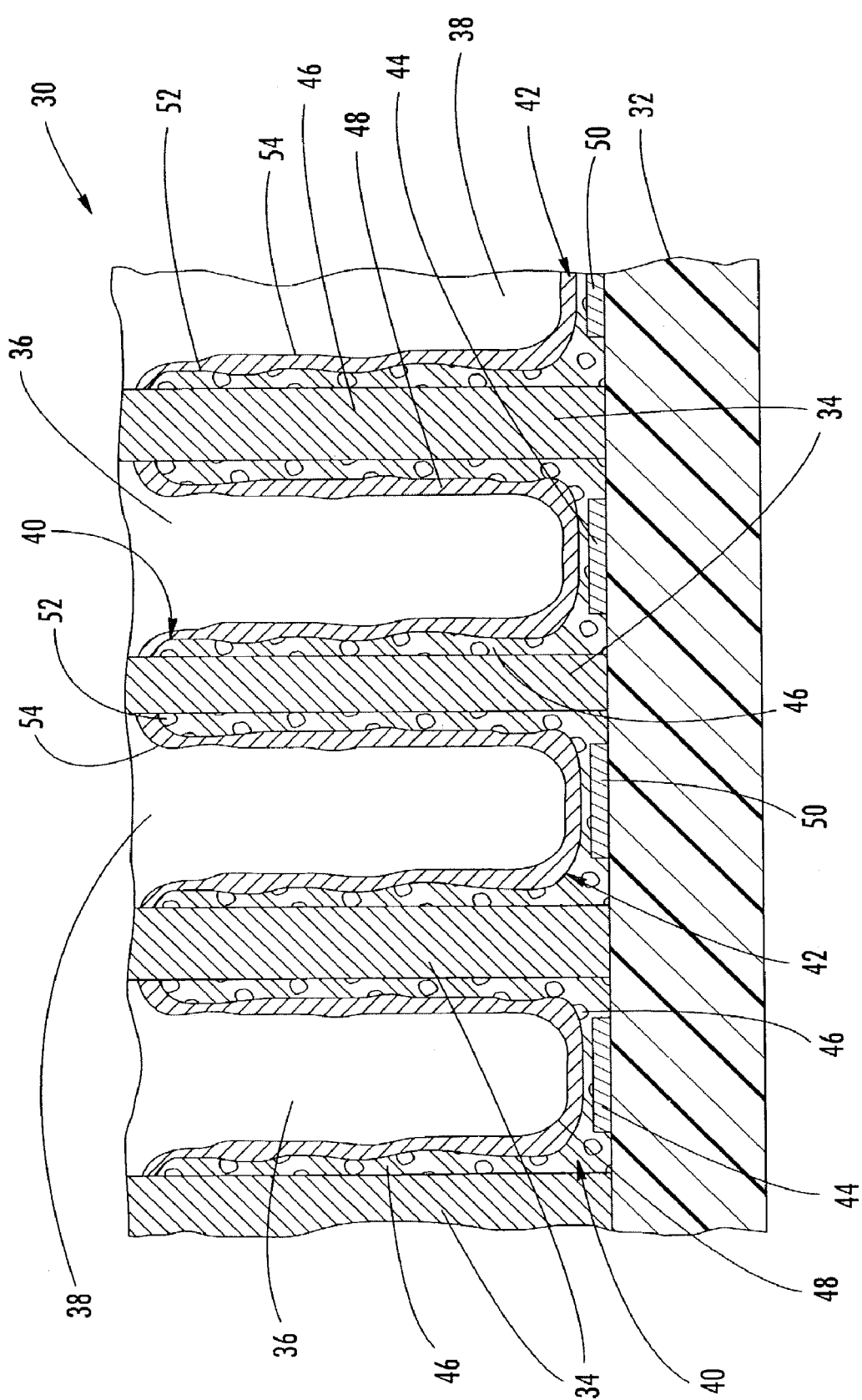
FIG. 2 is a schematic cross-sectional view taken along Line 2—2 of FIG. 1.
Figure 3:
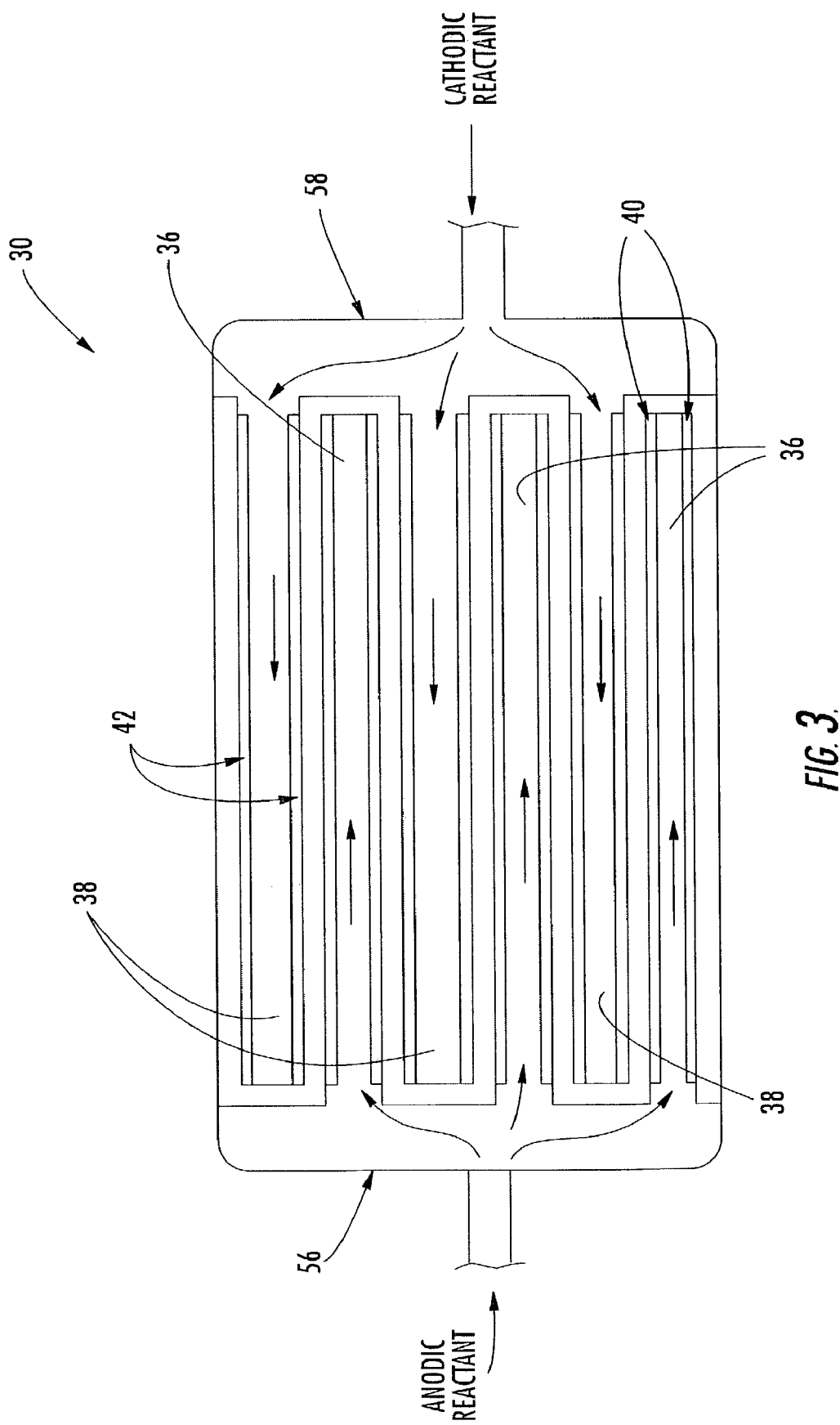
FIG. 3 is a schematic diagram of the microfuel cell of FIG. 1.

Referring to FIGS. 1–3, a microfuel cell 30 according to the present invention is now described. The microfuel cell 30 illustratively includes a substrate 32 and a plurality of spaced-apart PEM dividers 34 extending outwardly from the substrate. The PEM dividers 34 define a plurality of anodic and cathodic microfluidic channels 36, 38 for carrying, respectively, an anodic reactant and a cathodic reactant. The microfuel cell 30 further illustratively includes an anodic catalyst/electrode 40 lining at least a portion of each of the anodic microfluidic channels 36, and a cathodic catalyst/electrode 42 lining at least a portion of each of the cathodic microfluidic channels 38.

Illustratively, the plurality of anodic and cathodic microfluidic channels 36, 38 defined by the plurality of spaced-apart PEM dividers 34 are in an alternating relationship with one another. Although this provides particular advantages with respect to cooling the microfuel cell 30 and controlling the reactants within the microfluidic channels 36, 38, other combinations and permutations are possible. For example, anodic microfluidic channels could be arranged in pairs and alternate with pairs of cathodic microfluidic channels. Still other combinations and permutations are possible, as will be readily appreciated those skilled in the art.

Each anodic catalyst/electrode 40 illustratively comprises an electrode layer 46 impregnated with an anodic catalyst. Alternately, the anodic catalyst/electrode 40 may comprise a discrete catalyst layer underlying the porous electrode layer, the catalyst layer being thin enough to permit gas diffusion therethrough, as will be readily understood by those skilled in the art. Other types of anodic catalyst/electrodes may be alternately employed as will also be readily appreciated by those skilled in the art. A separate electrode 44 illustratively lies within each anodic microfluidic channel 36. The electrode may comprise, for example, aluminum or an aluminum alloy, doped or undoped polysilicon, gold, or tantalum.

The catalytic effect provided by the anodic catalyst/electrode 40 may be enhanced, for example, by partially dispersing the impregnating catalyst or discrete catalyst layer in the neighboring surface of the respective PEM divider 34, thereby increasing the reactive surface of the catalyst and reducing the travel path of ions ($H^+$) through the PEM divider during the energy generating reactions. The partial dispersion can be achieved, for example, by depositing a catalyst in granular form on the surface of the PEM divider 34 as will be appreciated by those skilled in the art. Alternately, for example, a thin metallic film may be deposited on the PEM divider 34, the film, as already noted, being sufficiently thin to permit diffusion of a gaseous reactant, as will also be appreciated by those skilled in the art.

An anodic diffusion layer 48 may optionally overlie each anodic catalyst/electrode 40, as shown. Illustratively, the anodic diffusion layer 48 overlies the electrode layer 46 impregnated with an anodic catalyst.

Although, the anodic diffusion layer 48 provides distinct advantages, it alternately may be eliminated from the microfuel cell 30 in some applications. Conversely, in still other applications, more than one diffusion layer may be used. As will be readily understood by those skilled in the art, heaters may be added to a diffusion layer to prime the reactions associated with the anodic catalyst/electrode 40.

Each cathodic catalyst/electrode 42 likewise illustratively comprises an electrode layer 52 impregnated with a cathodic catalyst. Again, as will be readily understood by those skilled in the art, the cathodic catalyst/electrode 42 alternately may comprise a discrete cathodic catalyst layer underlying a porous electrode layer and being thin enough to permit gas diffusion therethrough. Similarly, other known types of cathodic catalyst/electrodes may be alternately employed. As already described, the impregnating catalyst also may be partially dispersed in the neighboring surface of the respective PEM dividers 34 for enhanced catalytic effect. A separate electrode 50 illustratively lies within each cathodic microfluidic channel 38, as well, and may comprise, for example, aluminum or an aluminum alloy, doped or undoped polysilicon, gold, or tantalum.

A cathodic diffusion layer 54 illustratively overlies the cathodic catalyst/electrode 42. Again, though the cathodic diffusion layer 54 provides distinct advantages, it may be eliminated in certain applications of the microfuel cell 30.

Illustratively, the microfuel cell 30 further comprises an anodic reactant manifold 56 that, as shown, is in fluid communication with the anodic microfluidic channels 36. The microfuel cell 30 also illustratively includes a cathodic reactant manifold 58 that is in fluid communication with the microfluidic cathodic channels 38.

The anodic reactant manifold 56 and the cathodic reactant manifold 58 are able to cooperate with one another to cause the anodic and cathodic reactant to flow in opposite directions from one another as illustrated. This provides distinct cooling advantages relative to conventional microfuel cells.

Conventional microfuel cells typically carry anodic reactants in side-by-side channels on one side of an electrolyte, with the anodic reactant carried in side-by-side channels on the opposite side of the electrolyte. A single anodic electrode typically is between the anodic channels and the electrolyte, and a single cathodic electrode is between the cathodic channels and electrolyte. Accordingly, heat is generated on the anodic side of the electrolyte where oxidation of a fuel such as hydrogen or methanol occurs, as well as on the cathodic side where oxygen is reduced.

By contrast, the present invention carries the reactants in opposite directions in alternating channels so that generated heat is more evenly distributed. Moreover, the reactants may be carried in counterflow with respect to one another. Accordingly, the distal ends of the anodic channels 36, where it is expected that the temperature of the anodic reactant will be greater, are between proximal ends of the cathodic channels 38 where the cathodic reactant is entering and, accordingly, expected to be relatively cooler. Conversely, the distal ends of the cathodic channels 38 are between proximal ends of the anodic channels where the anodic reactant is entering the anodic channels.

This counterflow of the reactants thus provides advantageous cooling because the reactants entering at the proximal ends of their respective channels in a cooler state can be expected to cool the reactants that are farther inward along their respective channels and in a relatively warmer state. The cathodic channels also may be cooled by the water formed as a result of the combining of hydrogen and oxygen ions that are a by-product of the energy generating reaction.

The PEM dividers 34 also provide a unique advantage in that they provide an enhanced catalyst surface-to-volume ratio. This, in turn, provides a better power-to-size trade-off in so far as there is more catalytic surface area for carrying out the reactions that generate electrical power without requiring a corresponding increase in the volume of the microfuel cell 30. This makes the microfuel cell 30 particularly well suited for powering electronic devices needing a compact power source having a high power density.

Accordingly, the microfluidic anodic reactant channels 36 and the microfluidic cathodic reactant channels 38 preferably have a height greater than a width thereof. The greater the height of a PEM divider 34, the greater is the surface area available to facilitate energy generating reactions thereon. Thus, by increasing height relative to the width of the PEMs plus the channel space therebetween, a better ratio of reaction surface relative to a given substrate surface area is achieved. For example, the PEM dividers 34 may have a width of 20 microns and a height of 60 microns, with the space between any pair of PEM dividers being 5 microns.

Other advantageous dimensions, of course, are also possible. As will be readily understood by one skilled in the art, these dimensions, as well as others, can be easily achieved by extending each of the plurality of spaced-apart PEM dividers 34 outwardly from the substrate 32 a sufficient distance. Vertical oxide pillars, for example, may be added for enhanced structural integrity as the height of the PEM dividers 34 is increased.

Figure 4:
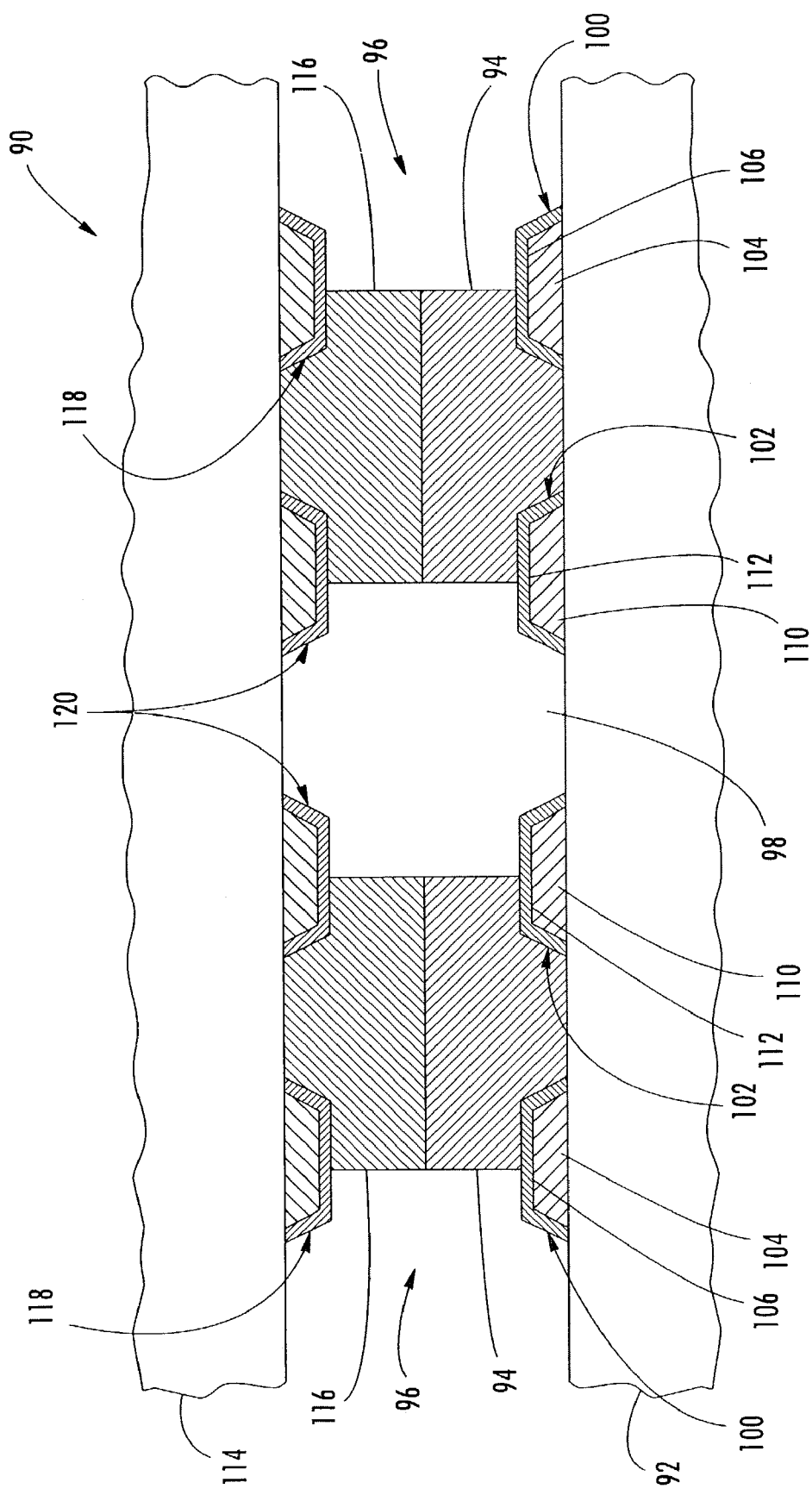
FIG. 4 is a schematic cross-sectional view of another embodiment of a microfuel cell according to the invention.

Referring additionally now to FIG. 4, another embodiment of a microfuel cell 90 according to the invention is described. The microfuel cell 90 illustratively includes a substrate 92. A plurality of spaced-apart PEM dividers 94 extends outwardly from the substrate 92 defining a plurality of anodic and cathodic microfluidic channels 96, 98 that carry respectively anodic and cathodic reactants. An anodic catalyst/electrode 100 lines at least a portion of each of the anodic microfluidic channels 96 while also extending beneath an adjacent portion of a respective PEM divider 94. Similarly, a cathodic catalyst/electrode 102 lines at least a portion of each cathodic microfluidic channel 98 and also extends beneath an adjacent portion of a respective PEM divider 94.

Again, the plurality of anodic and cathodic microfluidic channels 96, 98 that are defined by the plurality of spaced-apart PEM dividers 94 illustratively alternate with one another. As will be readily understood by those skilled in the art, alternate arrangements of the anodic and cathodic channels relative to one another may be employed even though the illustrated arrangement provides particular advantages, for example, in terms of cooling the microfuel cell 90.

Each anodic catalyst/electrode 100 illustratively comprises an electrode layer 104 and an anodic catalyst layer 106 overlying the electrode layer. Similarly, each cathodic catalyst/electrode 102 illustratively comprises an electrode layer 110 and a cathodic catalyst layer 112 overlying the electrode layer. As already noted, other constructions of the anodic and cathodic catalyst/electrodes 100, 102 known to those skilled in the art may alternately be used. Anodic and cathodic diffusion layers may optionally overly the anodic and cathodic catalyst layers, respectively.

Additionally, the microfuel cell 90 may include at least one additional substrate 114 from which a plurality of spaced-apart PEM dividers 116 outwardly extend, as shown. This second set of PEM dividers 116 may align with and connect to the PEM dividers extending outwardly from the other substrate 92 in defining the plurality of anodic and cathodic microfluidic channels 96, 98, as also shown. As illustrated, additional anodic catalyst/electrodes and cathodic catalyst/electrodes 118, 120 may optionally line at least a portion of the anodic and cathodic microfluidic channels 96, 98, respectively.

One advantage of this microfuel cell 90 is that energy generating reactions occur at a point at which the anodic and cathodic catalyst electrodes are exposed to the anodic and cathodic reactants in their respective channels 96, 98. Accordingly the reactants need not travel through an electrode layer to reach the PEM, thus allowing for an efficient energy generating reaction.

Figure 5:
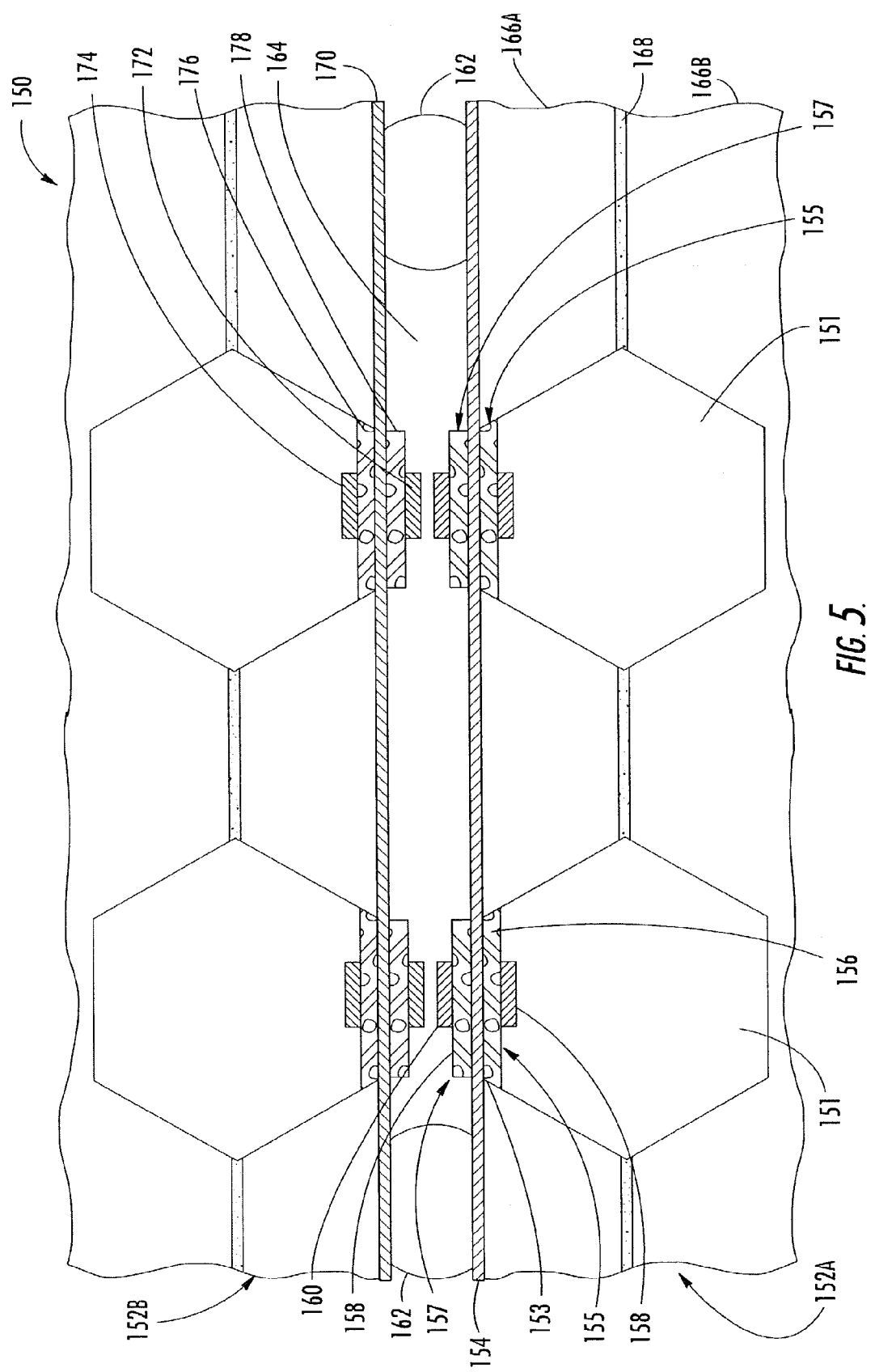
FIG. 5 is a schematic cross-sectional view of yet another embodiment of a microfuel cell according to the invention.

Yet another embodiment of the microfuel cell 150 is now described with specific reference to FIG. 5. The microfuel cell 150 illustratively includes a plurality of substrates 152A, 152B arranged in stacked relation, a first substrate 152A having first microfluidic fuel cell reactant channels 151 therein and opening upwardly to a first surface 153 thereof. A PEM layer 154 is illustratively adjacent the first surface 153 of the first substrate 152A and covers the first microfluidic fuel cell reactant channels 151.

Illustratively, an anodic catalyst/electrode 155 is adjacent one side of the PEM layer 154 and a cathodic catalyst/electrode 157 is adjacent an opposite side of the PEM layer. The anodic catalyst/electrode 155 illustratively comprises an electrode layer 156 impregnated with an anodic catalyst. Alternately, however, the anodic catalyst/electrode 155 may instead comprise a discrete, thin catalyst layer adjacent the PEM layer 154 and a porous electrode layer adjacent the thin catalyst layer. Illustratively, a solid electrode 158 is adjacent the catalyst/electrode 155.

Similarly, the cathodic catalyst/electrode 157 illustratively comprises an electrode layer 158 impregnated with a cathodic catalyst. Again, though, the cathodic catalyst/electrode 157 may instead comprise a discrete thin cathodic catalyst layer adjacent the PEM layer 154 with a porous electrode layer overlying the thin cathodic catalyst layer. Another solid electrode 160 illustratively is adjacent the cathodic catalyst/electrode 157.

An adhesive layer 162 illustratively secures the first substrate 152A to an adjacent substrate 152B so that the first substrate and the adjacent substrate are in a spaced relation from one another to thereby define at least one second microfluidic fuel cell reactant channel 164 between the substrates. Each substrate 152A, 152B may itself be optionally formed from separate substrate portions, as shown. For example, channels may be etched into surfaces of each of two substrate portions 166A, 166B (e.g., formed from a silicon wafer). The respective channels may then be aligned and the respective substrate portions 166A, 166B adhered to one another with another adhesive layer 168, as illustrated, thus forming the substrate 152A with first microfluidic fuel cell reactant channels 151 therein. A particular advantage of the microfuel cell 150 is that it provides increased surface area on which the energy generating reactions occur while also having a structure that lends itself to efficient manufacturing.

Illustratively, the first microfluidic fuel cell reactant channels 151 are thus lined with anodic catalyst/electrodes 155, while the cathodic catalyst/electrodes 157 are within the second microfluidic fuel cell reactant channel 164 between the respective substrates 152A, 152B. Accordingly, an anodic reactant is carried by the first microfluidic fuel cell reactant channels 151, and a cathodic reactant is carried by the second microfluidic fuel cell reactant channel 164 between the respective substrates 152A, 152B. It will be readily appreciated by those skilled in the art, however, that alternately the first microfluidic fuel cell reactant channels 151 instead may be lined with cathodic catalyst/electrodes, with the anodic catalyst/electrodes being within the second microfluidic fuel cell reactant channel 164. Accordingly, a cathodic reactant may be carried by the first microfluidic fuel cell reactant channels 151, and an anodic reactant may be carried by the second microfluidic fuel cell reactant channel 164.

Figure 6:
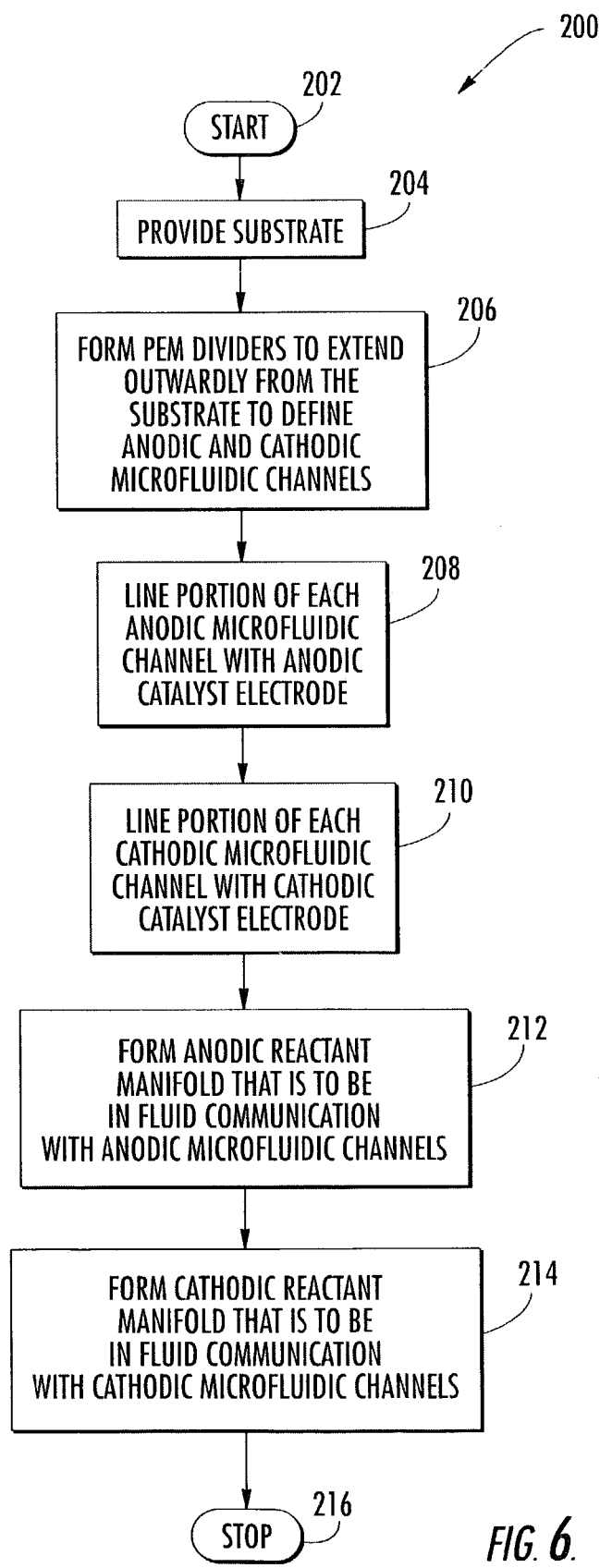
FIG. 6 is a flow diagram of a method of making a microfuel cell according to the present invention.

Another aspect of the present invention relates to a method of making a microfuel cell. As illustrated by the flow diagram 200 in FIG. 6, upon starting (Block 202), the method may include providing a substrate 32 at Block 204. At Block 206, the method further illustratively includes forming a plurality of spaced-apart PEM dividers 34 to extend outwardly from the substrate 32 to thereby define a plurality of anodic and cathodic microfluidic channels 36, 38 for carrying respective anodic and cathodic reactants. The spaced-apart PEM dividers 34 illustratively define alternating anodic and cathodic microfluidic channels. The channels 36, 38 may be formed by depositing a layer of PEM material on the substrate 32, and patterning and etching the layer using conventional semiconductor processing techniques as will be readily understood by those skill in the art.

Additionally, the method illustratively includes lining at least a portion of each anodic microfluidic channel 36 with an anodic catalyst/electrode 40 (Block 208). The method also illustratively includes lining at least a portion of each cathodic microfluidic channel 38 with a cathodic catalyst/electrode 42 (Block 210).

The method further illustratively comprises at Block 212 forming an anodic reactant manifold 56 in fluid communication with the anodic microfluidic channels, and, at Block 214, providing a cathodic reactant manifold 58 in fluid communication with the microfluidic cathodic channels. The anodic reactant manifold 56 and the cathodic reactant manifold 58 may be formed to cause respective anodic and cathodic reactant flows in opposite directions. The method illustratively concludes at Block 216.

Figure 7:
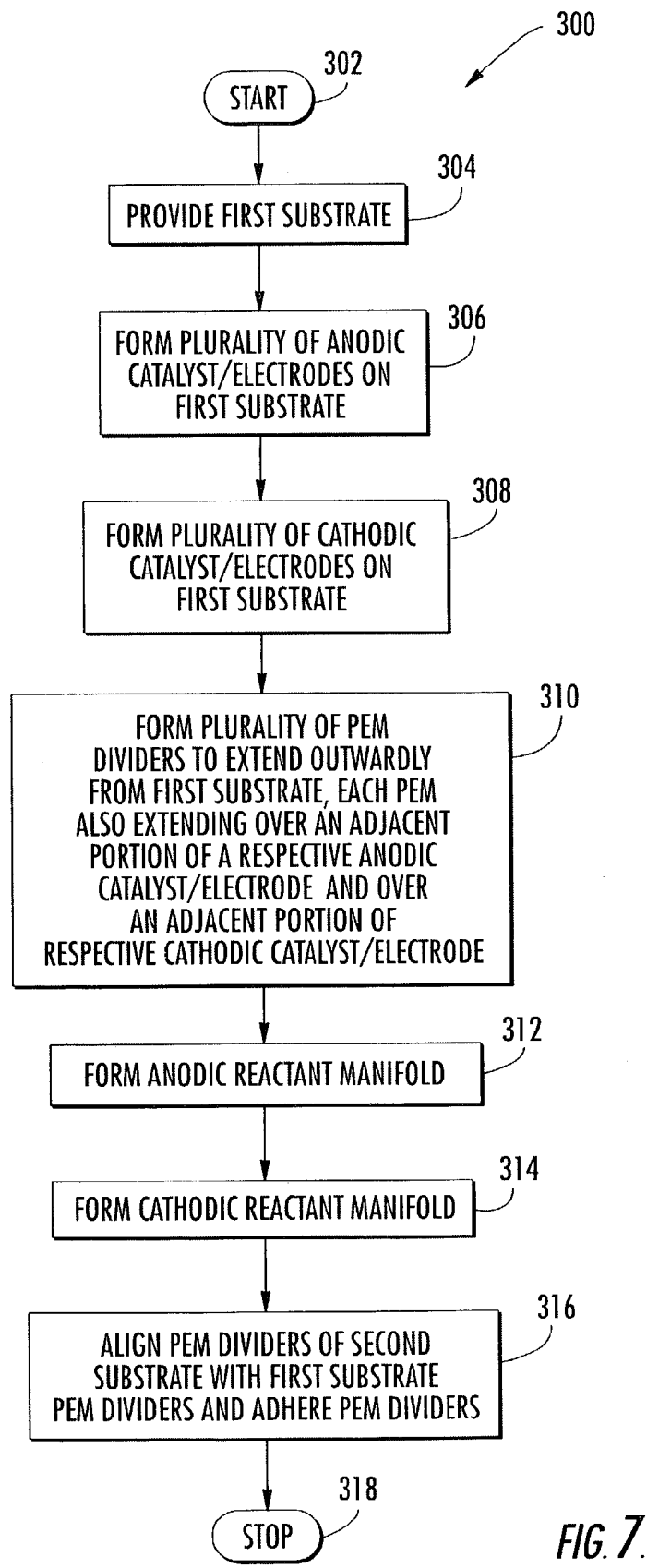
FIG. 7 is a flow diagram of another method of making a microfuel cell according to the present invention.

Another method of making a microfuel cell comprises a method of making the microfuel cell 90 shown in FIG. 4. The method is now described with particular reference to the flow diagram 300 of FIG. 7. Upon starting (Block 302), the method illustratively includes providing a first substrate 92 at Block 304. At Block 306 a plurality of anodic catalyst/electrodes 100 are formed on the first substrate 92, and at Block 308, a plurality of cathodic catalyst/electrodes 102 are similarly formed on the first substrate. The method further includes forming a plurality of spaced-apart PEM dividers 94 to extend outwardly from the substrate 92, each PEM divider also being formed to extend over an adjacent portion of a respective anodic catalyst/electrode 100 and over an adjacent portion of a respective cathodic catalyst/electrode 102 to thereby define a plurality of anodic and cathodic microfluidic channels 96, 98 for carrying respective anodic and cathodic reactants (Block 310).

Accordingly, the method provides for lining at least a portion of each anodic microfluidic channel 96 with an anodic catalyst/electrode 100 so that each anodic catalyst/electrode extends beneath an adjacent portion of a respective PEM divider, and lining at least a portion of each cathodic microfluidic channel 98 with a cathodic catalyst/electrode 102 so that each cathodic catalyst/electrode extends beneath an adjacent portion of a respective PEM divider.

The method, at Block 312, may also include forming an anodic reactant manifold in fluid communication with the anodic microfluidic channels, and, at Block 314, forming a cathodic reactant manifold in fluid communication with the cathodic microfluidic channels. A second substrate 114 from which a plurality of PEM dividers 116 extends may be stacked on the first substrate 92 (Block 316) such that respective PEM dividers of each substrate are aligned and adhered to one another. The method concludes at Block 318.

Figure 8:
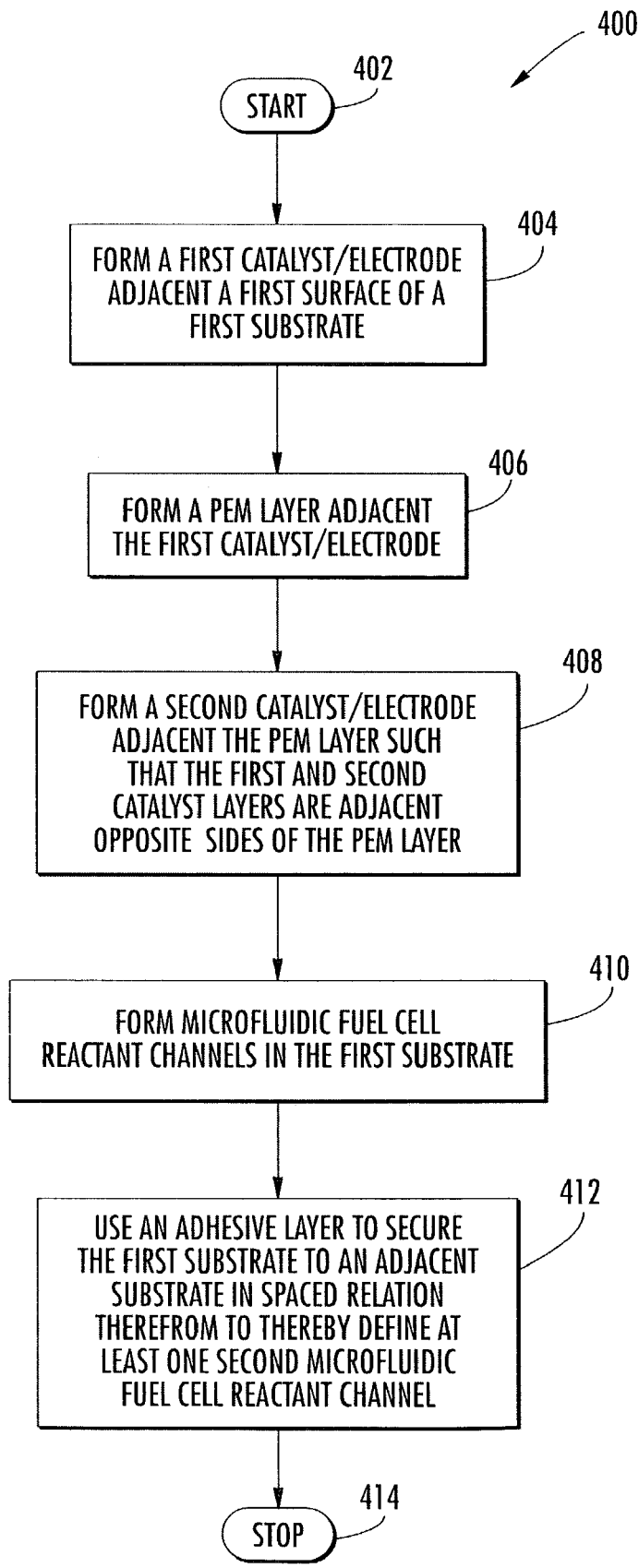
FIG. 8 is a flow diagram of yet another method of making a microfuel cell according to the present invention.

Referring now to the flow diagram 400 of FIG. 8, a method of making the microfuel cell 150 shown in FIG. 5 is now described. The method, upon starting (Block 402), illustratively includes at Block 404 forming a first electrode 158 and a first catalyst/electrode 155 adjacent a first surface 153 of a first substrate 152A. A PEM layer 154 is formed adjacent the first catalyst electrode 155 (Block 406). A second electrode 160 and second catalyst/electrode 157 are formed adjacent the PEM layer at Block 408 so that the first electrode 158 and first catalyst/electrode 155 are on one side of the PEM layer 154, and the second electrode 160 and second catalyst/electrode 157 are on an opposite side of the PEM layer. At Block 410, microfluidic fuel cell channels are formed in the first substrate 152A.

For example, as will be readily understood by those skilled in the art, the PEM layer 154, the first and second electrodes 158, 160, and the first and second catalyst/electrodes 155, 157 may be formed on a front surface of one 166A of two substrate portions 166A, 166B, the back surface of which may then be etched away to form channels that open to the PEM layer 154 and catalyst/electrodes 155, 157. Alternately, the channels may be etched before the PEM layer 154, first and second electrodes 158, 160, and first and second catalyst/electrodes 155, 157 are formed. Channels also may be etched in the other 166B of the two substrate portions 166A, 166B. The respective channels so formed in the substrate portions 166A, 166B may then be aligned and the substrates adhered to one another with an adhesive layer 168 to thus form a first substrate 152A with first microfluidic fuel cell reactant channels 151 therein.

Illustratively, the first catalyst/electrode 155 so formed comprises an anodic catalyst/electrode, and the second catalyst/electrode 157 comprises a cathodic catalyst/electrode. Alternately, though, the first catalyst/electrode may instead comprise a cathodic catalyst/electrode, and the second catalyst/electrode may comprise an anodic catalyst/electrode, as will be readily appreciated by those skilled in the art.

At Block 412, an adhesive layer 162 is used to secure the first substrate 152A to a second substrate 152B in spaced relation therefrom to thereby define at least one second microfluidic fuel cell reactant channel 164. The second substrate 152B may optionally include a PEM layer 170, first and second electrodes 172, 174, and first and second catalyst/electrodes 176, 178. The method concludes at Block 414.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and other embodiments are intended to be included within the scope of the appended claims.

That which is claimed is:

1. A microfuel cell comprising:
   a substrate having a generally flat uppermost surface;
   a plurality of spaced-apart proton exchange media (PEM) dividers extending outwardly form the generally flat uppermost surface of said substrate to define a plurality of anodic and cathodic microfluidic channels for carrying respective anodic and cathodic reactants, adjacent ones of said PEM dividers defining opposing sidewalls of a respective microfluidic channel therebetween;
   an anodic catalyst/electrode lining at least a portion of each of said anodic microfluidic channels; and
   a cathodic catalyst/electrode lining at least a portion of each said cathodic microfluidic channels.

2. A microfuel cell according to claim 1 wherein the plurality of anodic and cathodic microfluidic channels defined by the plurality of spaced-apart PEM dividers are alternating anodic and cathodic microfluidic channels.

3. A microfuel cell according to claim 1 wherein each anodic catalyst/electrode comprises an electrode layer impregnated with an anodic catalyst.

4. A microfuel cell according to claim 1 wherein each anodic catalyst/electrode comprises an electrode layer and an anodic catalyst layer adjacent said electrode layer.

5. A microfuel cell according to claim 1 further comprising an anodic diffusion layer overlying each anodic catalyst/electrode.

6. A microfuel cell according to claim 1 wherein each cathodic catalyst/electrode comprises an electrode layer impregnated with a cathodic catalyst.

7. A microfuel cell according to claim 1 wherein each cathodic catalyst/electrode comprises an electrode layer and a cathodic catalyst layer adjacent said electrode layer.

8. A microfuel cell according to claim 1 further comprising a cathodic diffusion layer overlying each cathodic catalyst/electrode.

9. A microfuel cell according to claim 1 further comprising:
   an anodic reactant manifold in fluid communication with said anodic microfluidic channels; and
   a cathodic reactant manifold in fluid communication with said cathodic microfluidic channels.

10. A microfuel cell according to claim 9 wherein said anodic reactant manifold and said cathodic reactant manifold cause respective anodic and cathodic reactant flows in opposite directions.

11. A microfuel cell according to claim 1 wherein each anodic microfluidic reactant channel has a height greater than a width thereof.

12. A microfuel cell according to claim 1 wherein each cathodic microfluidic reactant channel has a height greater than a width thereof.

13. A microfuel cell according to claim 1 wherein each of said PEM dividers comprises an organic polymer.

14. A microfuel cell according to claim 1 wherein said substrate comprises silicon.

15. A microfuel cell according to claim 1 wherein the anodic reactant comprises at least one of hydrogen ($H_2$), methane ($CH_4$), ethane ($C_2H_6$), propane ($C_3H_8$), butane ($C_4H_{10}$), and methanol ($CH_3OH$).

16. A microfuel cell according to claim 1 wherein the cathodic reactant comprises oxygen ($O_2$).

17. A microfuel cell according to claim 1 wherein each anodic catalyst/electrode further extends beneath an adjacent portion of a respective PEM divider.

18. A microfuel cell according to claim 1 wherein each cathodic catalyst/electrode further extends beneath an adjacent portion of a respective PEM divider.

19. A microfuel cell comprising:
   a substrate having a generally flat uppermost surface;
   a plurality of spaced-apart proton exchange media (PEM) dividers extending outwardly from the generally flat uppermost surface of said substrate to define a plurality of anodic and cathodic microfluidic channels for carrying respective anodic and respective microfluidic channel therebetween;
   an anodic catalyst/electrode lining at least a portion of each of said anodic microfluidic channels and extending beneath an adjacent portion of a respective PEM divider; and a cathodic catalyst/electrode lining at least a portion of each of said cathodic microfluidic channels and extending beneath an adjacent portion of a respective PEM divider.

20. A microfuel cell according to claim 19 wherein the plurality of anodic and cathodic microfluidic channels defined by the plurality of spaced-apart PEM dividers are alternating anodic and cathodic microfluidic channels.

21. A microfuel cell according to claim 19 wherein each anodic catalyst/electrode comprises an electrode layer impregnated with an anodic catalyst.

22. A microfuel cell according to claim 19 wherein each anodic catalyst/electrode comprises an electrode layer and an anodic catalyst layer adjacent said electrode layer.

23. A microfuel cell according to claim 19 further comprising an anodic diffusion layer overlying each anodic catalyst/electrode.

24. A microfuel cell according to claim 19 wherein each cathodic catalyst/electrode comprises an electrode layer impregnated with a cathodic catalyst.

25. A microfuel cell according to claim 19 wherein each cathodic catalyst/electrode comprises an electrode layer and a cathodic catalyst layer adjacent said electrode layer.

26. A microfuel cell according to claim 19 further comprising a cathodic diffusion layer overlying each cathodic catalyst/electrode.

27. A microfuel cell according to claim 19 further comprising:
an anodic reactant manifold in fluid communication with said anodic microfluidic channels; and
a cathodic reactant manifold in fluid communication with said cathodic microfluidic channels.

28. A microfuel cell according to claim 27 wherein said anodic reactant manifold and said cathodic reactant manifold cause respective anodic and cathodic reactant flows in opposite directions.

29. A microfuel cell according to claim 19 wherein each anodic microfluidic reactant channel has a height greater than a width thereof.

30. A microfuel cell according to claim 19 wherein each cathodic microfluidic reactant channel has a height greater than a width thereof.

31. A microfuel cell according to claim 19 wherein each of said PEM dividers comprises an organic polymer.

32. A mcirofuel cell according to claim 19 wherein said substrate comprises silicon.

33. A microfuel cell according to claim 19 wherein the anodic reactant comprises at least one of hydrogen ($H_2$), methane ($CH_4$), ethane ($C_2H_6$), propane ($C_3H_8$), butane ($C_4H_{10}$), and methanol ($CH_3OH$).

34. A microfuel cell according to claim 19 wherein the cathodic reactant comprises oxygen ($O_2$).

35. A method of making a microfuel cell, the method comprising:
forming a plurality of spaced-apart proton exchange media (PEM) dividers to extend outwardly from a generally flat uppermost surface of a substrate to thereby define a plurality of anodic and cathodic microfluidic channels for carrying respective anodic and cathodic reactants, adjacent ones of the said PEM dividers defining opposing sidewalls of a respective microfluidic channel therebetween;
lining at least a portion of each anodic microfluidic channel with an anodic catalyst/electrode; and
lining at least a portion of each cathodic microfluidic channel with a cathodic catalyst/electrode.

36. A method according to claim 35 wherein forming comprises forming the plurality of spaced-apart PEM dividers to extend from the substrate to define alternating anodic and cathodic microfluidic channels.

37. A method according to claim 35 wherein each anodic catalyst/electrode comprises an electrode layer impregnated with an anodic catalyst.

38. A method according to claim 35 wherein each anodic catalyst/electrode comprises an electrode layer and an anodic catalyst layer adjacent the electrode layer.

39. A method according to claim 35 further comprising forming an anodic diffusion layer over each anodic catalyst/electrode.

40. A method according to claim 35 wherein each cathodic catalyst/electrode comprises an electrode layer impregnated with a cathodic catalyst.

41. A method according to claim 35 wherein each cathodic catalyst/electrode comprises an electrode layer and a cathodic catalyst layer adjacent the electrode layer.

42. A method according to claim 35 wherein further comprising forming a cathodic diffusion layer over each cathodic catalyst/electrode.

43. A method according to claim 35 further comprising:
forming an anodic reactant manifold in fluid communication with the anodic microfluidic channels; and
forming a cathodic reactant manifold in fluid communication with the cathodic microfluidic channels.

44. A method according to claim 43 wherein the anodic reactant manifold and the cathodic reactant manifold cause respective anodic and cathodic reactant flows in opposite directions.

45. A method according claim 35 wherein forming comprises forming each anodic microfluidic reactant channel to extend from the substrate to a height greater than a width of the anodic microfluidic reactant channels; and wherein forming comprises forming each cathodic microfluidic reactant channel to extend from the substrate to a height greater than a width of the cathodic microfluidic reactant channels.

46. A method of making a microfuel cell, the method comprising:
forming a plurality of anodic and cathodic catalyst/electrodes on a substrate; and
forming a plurality of spaced-apart proton exchange media (PEM) dividers to extend outwardly from a generally flat uppermost surface of the substrate, each PEM divider being formed to also extend over an adjacent portion of a respective anodic catalyst/electrode and over an adjacent portion of a respective cathodic catalyst/electrode to thereby define a plurality of anodic and cathodic microfluidic channels for carrying respective anodic and cathodic reactants, adjacent ones of the PEM dividers defining opposing sidewalls of a respective microfluidic channel therebetween.

47. A method according to claim 46 wherein forming the plurality of spaced-apart PEM dividers further comprises forming the plurality of spaced-apart PEM dividers to extend from the substrate to define alternating anodic and cathodic microfluidic channels.

48. A method according to claim 46 wherein each anodic catalyst/electrode comprises an electrode layer impregnated with an anodic catalyst.

49. A method according to claim 46 wherein each anodic catalyst/electrode comprises an electrode layer and an anodic catalyst layer adjacent the electrode layer.

50. A method according to claim 46 further comprising forming an anodic diffusion layer over each anodic catalyst/electrode.

51. A method according to claim 46 wherein each cathodic catalyst/electrode comprises an electrode layer impregnated with a cathodic catalyst.

52. A method according to claim 46 wherein each cathodic catalyst/electrode comprises an electrode layer and a cathodic catalyst layer overlying the electrode layer.

53. A method according to claim 46 further comprising forming a cathodic diffusion layer over each cathodic catalyst/electrode.

54. A method according to claim 46 further comprising:
forming an anodic reactant manifold in fluid communication with the anodic microfluidic channels; and
forming a cathodic reactant manifold in fluid communication with the cathodic microfluidic channels.

55. A method according to claim 54 wherein the anodic reactant manifold and the cathodic reactant manifold cause respective anodic and cathodic reactant flows in opposite directions.

56. A method according claim 46 wherein each anodic microfluidic reactant channel extends from the substrate to a height greater than a width of the anodic microfluidic reactant channels; and wherein each cathodic microfluidic reactant channel extends from the substrate to a height greater than a width of the cathodic microfluidic reactant channels.

* * * * *

UNITED STATES PATENT AND TRADEMARK OFFICE
CERTIFICATE OF CORRECTION

PATENT NO. : 7,029,781 B2  Page 1 of 1
APPLICATION NO. : 10/348519
DATED : April 18, 2006
INVENTOR(S) : Lo Priore et al.

It is certified that error appears in the above-identified patent and that said Letters Patent is hereby corrected as shown below:

Column 10, Line 62

Delete: "and respective"

Insert: --and cathodic reactants, adjacent ones of said PEM dividers defining opposing sidewalls of a respective --

Signed and Sealed this

Ninth Day of January, 2007

JON W. DUDAS
*Director of the United States Patent and Trademark Office*